(12) United States Patent
Chen

(10) Patent No.: US 11,863,989 B2
(45) Date of Patent: Jan. 2, 2024

(54) SYSTEM AND METHOD FOR RESISTING QUANTUM PERTURBATION THREATS TO QUANTUM COMMUNICATION DEVICES

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 376 days.

(21) Appl. No.: 17/340,060

(22) Filed: Jun. 6, 2021

(65) Prior Publication Data

US 2022/0394478 A1 Dec. 8, 2022

(51) Int. Cl.
*H04W 12/122* (2021.01)
*G06N 10/00* (2022.01)
*H04B 10/70* (2013.01)

(52) U.S. Cl.
CPC .......... *H04W 12/122* (2021.01); *G06N 10/00* (2019.01); *H04B 10/70* (2013.01)

(58) Field of Classification Search
CPC .. H04W 12/122; H04B 10/70; H04L 63/1425; G06N 10/00; G06N 10/40
See application file for complete search history.

(56) References Cited

U.S. PATENT DOCUMENTS

| 11,438,148 B2 * | 9/2022 | Chen ..................... H04L 9/0662 |
| 11,562,070 B2 * | 1/2023 | Chen ..................... G06F 17/16 |
| 2023/0155822 A1 * | 5/2023 | Chen ..................... G06N 10/00 257/14 |

\* cited by examiner

*Primary Examiner* — Han Yang

(57) ABSTRACT

A system and method for resisting quantum perturbation threats to quantum communication devices, especially to a quantum cyber security technology for sensing external perturbations to a quantum communication device and for performing perturbation-bias correction in a non-Hermitian system. Through observing and analyzing on a resonant model, such technology not only senses suspicious potential variation which may make potential energy related to a quantum computing device be changed, but also enhances to implement a correction policy coupling to an information-correction sub-system. Meanwhile it patterns the detected perturbation threats with relative permeability so as to provide early protection on a quantum communication device for resisting a risky perturbation threat.

11 Claims, 11 Drawing Sheets

SYSTEM AND METHOD FOR RESISTING QUANTUM PERTURBATION THREATS TO QUANTUM COMMUNICATION DEVICES

BACKGROUND OF THE INVENTION

1. Field of the Invention

The present invention relates to a system and method for resisting quantum perturbation threats to quantum communication devices, and in particular, to a quantum cyber security technology for sensing external perturbation to a quantum communication device and performing perturbation-bias correction in a non-Hermitian system.

2. Description of the Related Art

So far, most of conventional quantum cyber security technologies mainly focus on the development of quantum key distribution (QKD) technology or post-quantum cryptography (PQC) technology. There is still no corresponding solution for perturbation threats on quantum communication devices, nor any practical way to detect such possible occurrences in advance or in time so as to provide early alerts and perform instant reactions. Therefore, it is desirable to develop approaches or a system to provide solutions for detection of quantum perturbation threats and corresponding bias correction.

BRIEF SUMMARY OF THE INVENTION

In view of the drawbacks of the prior art, it is an object of the present invention to provide a system and method for resisting quantum perturbation threats to quantum communication devices. Once a system can provide an administrator of a quantum communication system significant warnings at the early stage of the occurrence of a quantum perturbation threat, the administrator will be able to take effective actions in time so as to perform operations of bias correction for preventing cyber-security risks caused by deviations of quantum-state measurement, frequent re-transmissions, or asynchronous receiving issues.

Furthermore, the present invention can pattern the detected quantum perturbation threats, thereby to implement tracking and warning mechanisms to the perturbation threats around a quantum communication device. Such technology can be applied to an electronic device or system with reasonable cost, and is applicable for protecting most of quantum communication devices as well. Meanwhile, it effectively extends the scope of prior arts for resisting quantum cyber-security risks, and also provides conventional quantum communication devices with a practical solution to deal with a bias result of quantum computing, wherein such bias result is usually due to the variation of a rectangular potential barrier related to an operation of the quantum communication device since some external potential energy around the device may be changed critically.

To achieve the above objects and more, the present invention provides a solution for resisting quantum perturbation threats to quantum communication devices. Wherein the solution (or a system) is implemented with the following approaches and dataflow: a) first, sensing the frequency spectrum in a local environment for wireless or optical communication for deriving a harmonic oscillator to be simulated in an optical-resonant cavity based on a combination of observed phases; b) thereafter, deriving simulated wave functions via means of Hamiltonian operations according to the derived harmonic oscillator that facilitates finding possible exception points in a non-Hermitian local system; c) moreover, performing spectral analysis to discard the exception point which is occurred with zero-point energy so as to determine whether there is some quantum symmetry attribute broken in a local system; d) detecting tiny variation of gravity via leveraging microelectromechanical system (MEMS) after determining that there is a quantum symmetry attribute broken in the local system; e) thereafter, detecting slow-light phenomenon via leveraging a Fourier analyzer to monitor group velocity of optical pulses in a local environment around a quantum computing device if a tiny variation of gravity is detected; f) thereafter, estimating phases through means of inverse quantum Fourier transform (QFT) for the derived system wave function simulated in a non-Hermitian local system if a slow-light phenomenon is detected; g) thereafter, setting up various scales based on the estimated phases for monitoring multiscale entropy and then analyzing the slope of an approximative multiscale entropy in a non-Hermitian local system to facilitate detecting an abnormal reduction of multiscale entropy in a non-Hermitian local system during a specific period; h) determining that there may be some quantum perturbation threat performed to a quantum communication device based on the detection results of broken quantum symmetry attribute, slow-light phenomenon with tiny gravity variation, and abnormal reduction of multiscale entropy in a non-Hermitian local system; i) performing a mechanism of bias correction on the quantum computing device via leveraging First order corrections of time-independent perturbation theory after determining that there is quantum perturbation threat to quantum communication devices; and j) for an advanced solution, transforming a permeability obtained from measuring a geomagnetic variation to a relative permeability so as to be a featured parameter that helps to track and classify the history abnormal events. Thus, that will achieve the effect of resisting quantum-perturbation threats to a quantum communication device.

It is to be noted that the following mentioned sub-systems and modules are equivalent to a set of loadable software libraries or instructions with coded algorithm stored in a non-volatile memory, which can be re-accessed for performing a series of subroutines step by step.

In order to implement the above-mentioned approaches and dataflow, the present invention provides an embodiment for use over a quantum-communication device or system to resist quantum perturbation threats. This embodiment implements a system including: a first sub-system for sensing the frequency spectrum related to wireless or optical communication to determine whether there is some quantum symmetry attribute broken in a local system; a second sub-system coupled to the first sub-system, for detecting tiny variations of gravity and slow-light phenomenon in a local environment when the first sub-system determines that there is some broken quantum symmetry attribute; a third sub-system coupled to the second sub-system, for detecting an abnormal reduction of multiscale entropy in a non-Hermitian local system during a specific period when the second sub-system determines that there is a tiny variation of gravity and slow-light phenomenon in a local environment; a fourth sub-system to perform a mechanism of bias correction on the quantum communication device when all of the first sub-system, the second sub-system, and the third sub-system report abnormal events; and a fifth sub-system to launch abnormal events and tag the launched abnormal events for further tracking via making use of a relative permeability.

In an embodiment, the first sub-system collaborating with an optical-resonant cavity, a radio sensor and a spectrum analyzer performs frequency-spectrum sensing-and-analyzing operations for a non-Hermitian system, wherein the frequency-spectrum sensing-and-analyzing operations comprise: 1) deriving a harmonic oscillator to be simulated in the optical-resonant cavity based on a combination of observed phases via sensing frequency spectrum in a local environment for wireless or optical communication; 2) deriving simulated wave functions via means of Hamiltonian operations according to the derived harmonic oscillator that facilitates finding possible exception points in a non-Hermitian local system; and 3) performing spectral analysis with the spectrum analyzer to discard the exception point which is occurred with zero-point energy so as to determine whether there is some quantum symmetry attribute broken in a local system.

In order to implement the above operations, in an embodiment, the first sub-system includes the following modules: an optical-resonant cavity module, a wave-function derivation module, an exception-point derivation module, and a spectral analysis module. Wherein, the optical-resonant cavity module derives a harmonic oscillator, and works with the radio sensor to make the oscillator be simulated in the optical-resonant cavity based on a combination of phases observed from the sensed frequency spectrum. Thereafter, through means of Hamiltonian operations, the wave-function derivation module derives simulated wave functions according to the derived harmonic oscillator. Thereafter, the exception-point derivation module derives possible exception points of a non-Hermitian system according to the derived simulated wave functions. Furthermore, the spectral analysis module drives the spectrum analyzer to perform spectral analysis for discarding the exception point which is occurred with zero-point energy. Once there is still an exception point after the above operations, the first sub-system will determine that there is some quantum symmetry attribute broken in a local system. The above computing modules and operations can be implemented, based on relevant technology, as a software unit, hardware unit, or a combination of software and hardware units. However, integrating the above modules as a frequency-spectrum-sensing sub-system, comes out a synergy that facilitates to find the cases that may exist bias on some result of quantum computing due to some quantum symmetry attribute broken in a local system. Meanwhile, based on the native features of exception points, such found cases may also imply that some quantum states and spin attributes in use had been detected by some external group, and this is an effect that the conventional technologies cannot achieve it.

In an embodiment, in order to derive simulated wave functions in efficiency, the above-mentioned means of Hamiltonian operations comprise: 1) treating an optical-resonant cavity as a non-Hermitian local system where there is zero-potential energy at infinitely far from the earth's surface; 2) introducing all affordable binding energy provided by the optical-resonant cavity for measuring a maximum kinetic energy of a particular particle where the potential energy is deemed to be zero; and 3) introducing each measured maximum kinetic energy of a particular particle into a Time-independent Schrödinger equation with reduced Planck constant for deriving an applicable momentum operator, and then introducing the momentum operator to a Hamiltonian operator so as to derive all the wave functions simulated by the derived harmonic oscillator in the local system.

In an embodiment, the above-mentioned second sub-system coupled to the first sub-system collaborates a micro-electromechanical system (MEMS), a LiDAR (light detection and ranging) and a Fourier Analyzer to perform gravity sensing-and-analyzing operations for finding cases with impacted quantum phases, wherein the gravity sensing-and-analyzing operations comprise: 1) detecting tiny variation of gravity via leveraging a MEMS after the first sub-system determining that there is a quantum symmetry attribute broken in the local system; and 2) detecting slow-light phenomenon via leveraging a Fourier Analyzer to monitor group velocity of optical pulses in a local environment around a quantum computing device if a tiny variation of gravity is detected.

In order to implement the above gravity sensing-and-analyzing operations, in an embodiment, the second sub-system includes the following modules: a gravity sensing module, and a slow-light analysis module. Wherein, the gravity sensing module collaborates a quantum MEMS for detecting tiny variations of gravity; once a tiny variation of gravity is found in a local environment, the slow-light analysis module will be triggered. Thereafter, the slow-light analysis module will drive the LiDAR and the Fourier Analyzer to monitor group velocity of optical pulses in a local environment around a quantum computing device so as to confirm whether there is slow-light phenomenon in the local environment. Once the second sub-system confirms that there is tiny variation of gravity meanwhile the group velocity of optical pulses is slowed down, it implies the local quantum communication environment may be disturbed by some external factor. Combining these modules in an implementation of software, hardware, or a combination of software and hardware as a gravity-sensing sub-system not only provide an advanced sifter for abnormal cases but also provides a detector solution to find cases which may relate to a threat with vortex electric field. This is an effect that the conventional technologies cannot achieve.

In an embodiment, the above-mentioned third sub-system performs estimation-and-analysis operations for detecting an abnormal reduction of multiscale entropy in a non-Hermitian local system during a specific period, wherein the estimation-and-analysis operations comprise: 1) estimating phases through means of inverse quantum Fourier transform (QFT) for the derived system wave function simulated in a non-Hermitian local system if a slow-light phenomenon is detected; and 2) setting up various scales based on the estimated phases for monitoring multiscale entropy and then analyzing the slope of an approximative multiscale entropy in a non-Hermitian local system to facilitate detecting an abnormal reduction of multiscale entropy in a non-Hermitian local system during a specific period.

In order to implement the above estimation-and-analysis operations, in an embodiment, the third sub-system includes the following modules: a phase-estimation module, and a multiscale-entropy analysis module. Wherein, the phase-estimation module estimates the phase information through means of inverse QFT for a system wave function observed in a non-Hermitian local system; after the phase-estimation module providing estimated phase, the multiscale-entropy analysis module will setup various scales according to the estimated phase for monitoring multiscale entropy and analyzing the slope of an approximative multiscale entropy so as to determine whether there is an abnormal reduction of multiscale entropy in a non-Hermitian local system during a specific period. Combining these modules in an implementation of software, hardware, or a combination of software and hardware as a multiscale-entropy analysis sub-system not only provides an advanced sifter for abnormal cases caused by external hits but also facilitates finding some cases which may relate to unqualified photon transmission. This is an effect that the conventional technologies cannot achieve.

In an embodiment, in order to facilitate estimating optical phases, wherein the above-mentioned means of inverse QFT comprise the following operations: 1) deriving eigenvector from a linear combination of wave functions simulated from a harmonic oscillator in an optical-resonant cavity, and letting the corresponding eigenvalue be $e^{2\pi i\theta}$ where i is $\sqrt{-1}$ so as to derive a unitary operator U that makes $U|\Psi\rangle$ equal to $e^{2\pi i\theta}|\Psi\rangle$; 2) collaborating quantum-simulation logic circuits with the derived unitary operator U to perform controlled-unitary operations on n q-bits of a quantum communication device to derive a quantum state of $$\frac{1}{2^{\frac{n}{2}}}\sum_{k=0}^{2^n-1}e^{2\pi i\theta k}|k\rangle_1,$$

wherein $|k\rangle$ means the k-th basis in binary expression, thereby the n q-bits as the input of the simulated quantum circuits will be part of phase information θ; and 3) in condition that the phase information is θ, storing the probability amplitude of the above derived quantum state into corresponding bases via leveraging inverse operation of Quantum Fourier Transform to derive a transformed state, and then measuring the transformed state for getting the original quantum signal where the measured θ implies the corresponding phase.

In an embodiment, the system determines that there should be a quantum perturbation threat to the quantum communication device when all of the first sub-system, the second sub-system, and the third sub-system report abnormal events; and then the system drives a fourth sub-system coupled to a PT-symmetry (parity-time symmetry) quantum sensor to perform a mechanism of bias correction on the quantum communication device so as to resist impacts of the quantum-perturbation threat. Wherein the mechanism of bias correction on the quantum computing device comprises the following operations: 1) setting up a parameter space based on a found exception point in a non-Hermitian system; 2) simulating to introduce complete corresponding parameters of the parameter space clockwise so as to derive a quantum state; 3) simulating to introduce complete corresponding parameters of the parameter space counterclockwise so as to derive another quantum state; 4) confirming the above two derived quantum states satisfy parity-time symmetry; 5) deriving an expected direction where a perturbation shall come according to the corresponding non-orthogonal bases from the derived quantum states satisfying parity-time symmetry, and determining whether the observed direction where a perturbation comes fits the expected direction via making use of a PT-symmetry quantum sensor; 6) once the operation 4) confirmed that the above two derived quantum states satisfy parity-time symmetry and the operation 5) also determined that the observed direction where a perturbation came was not in expectation, the states derived from the parameter space will be treated as corrected quantum states in a local system, otherwise the system will stop the current quantum communication; and 7) making use of the corrected states to derive a corresponding system wave function via the Schrödinger equation, and the performing First order corrections of time-independent perturbation theory based on the derived system wave function. Wherein, the above-mentioned operation 1)~3) are deemed to state-simulation processes hereafter; the above-mentioned operation 5) is deemed to a perturbation-direction measurement process hereafter; and the above-mentioned operation 6)~7) are deemed to system-wave-function derivation-and-correction processes hereafter.

In order to implement the above-mentioned mechanism of bias correction, in an embodiment, the fourth sub-system includes the following modules: a state-simulation module, a PT-Symmetric measurement module, a perturbation-direction measurement module, and a wave-function-correction module. Wherein, the state-simulation module performs state-simulation processes to get applicable states based on the exception points derived from the first sub-system; thereafter the PT-Symmetric measurement module confirms that the derived states based on the exception points satisfy parity-time symmetry; thereafter the perturbation-direction measurement module coupled to a PT-symmetry quantum sensor confirms that a measured direction of the perturbation is not in expectation based on an exception point through a perturbation-direction measurement process; and finally the wave-function-correction module performs system-wave-function derivation-and-correction processes which derive a corresponding system wave-function based on the applicable states derived from the state-simulation module so as to perform First order corrections of time-independent perturbation theory based on the derived system wave-function. Combining these modules in an implementation of software, hardware, or a combination of software and hardware as an information-correction sub-system not only provides a bias correction mechanism for broken quantum information stroked by external perturbation or caused by unqualified optical transmission, but also facilitates extending transmission scale for conventional quantum key distribution (QKD) solutions. This is an effect that the conventional technologies cannot achieve.

In some embodiments, in order to make use of the corrected states to derive a corresponding system wave function via the Schrödinger equation, the above-mentioned system-wave-function derivation-and-correction processes further comprise the following operations: 1) deriving an eigenvector (eigenstate) of the corrected quantum states; 2) performing linear combination on the derived eigenstates based on the derived exception points so as to obtain applicable orthonormal bases; and 3) deriving a system wave function, in which the total summation of the probability is 1 via linear combination in accordance with the linear attribute of Schrödinger equations and each probability amplitude measured from each eigenstate of applicable orthonormal bases.

Meanwhile, in an embodiment, once the system determines that there should be a quantum perturbation threat to the quantum communication device, in order to facilitate tracking and classifying history abnormal events, the following abnormal-event tagging operations will be performed by a fifth sub-system: 1) measuring a geomagnetic variation so as to obtain a corresponding permeability; 2) transforming the obtained permeability to a relative permeability so as to be a featured parameter; and 3) tracking and classifying the history abnormal events in accordance with such a featured parameter.

In order to implement the above-mentioned abnormal-event tagging operations, in an embodiment, the fifth sub-system includes the following modules: an abnormal-event warning module, and a permeability detection module. Wherein, the abnormal-event warning module reports triggered abnormal events to a system administrator for further reactions; and the permeability detection module measures a geomagnetic variation when an abnormal event is triggered by all of the first sub-system, the second sub-system, and the third sub-system, so as to obtain a corresponding relative permeability to a specific abnormal event that such a magnetic permeability will facilitate to track and classify history abnormal events.

DETAILED DESCRIPTION OF THE INVENTION

To facilitate understanding of the objects, characteristics and effects of this present disclosure, embodiments together with the attached drawings for the detailed description of the present disclosure are provided.

A plurality of embodiments in regard to a quantum perturbation threat resistant system or integrated with a quantum communication device are provided as follows. In some embodiments this technology can be coupled to measurement apparatuses and sensors to implement mechanisms for finding perturbation threats and for performing bias correction, with computing units without luxury capital expenditure.

Figure 1A:
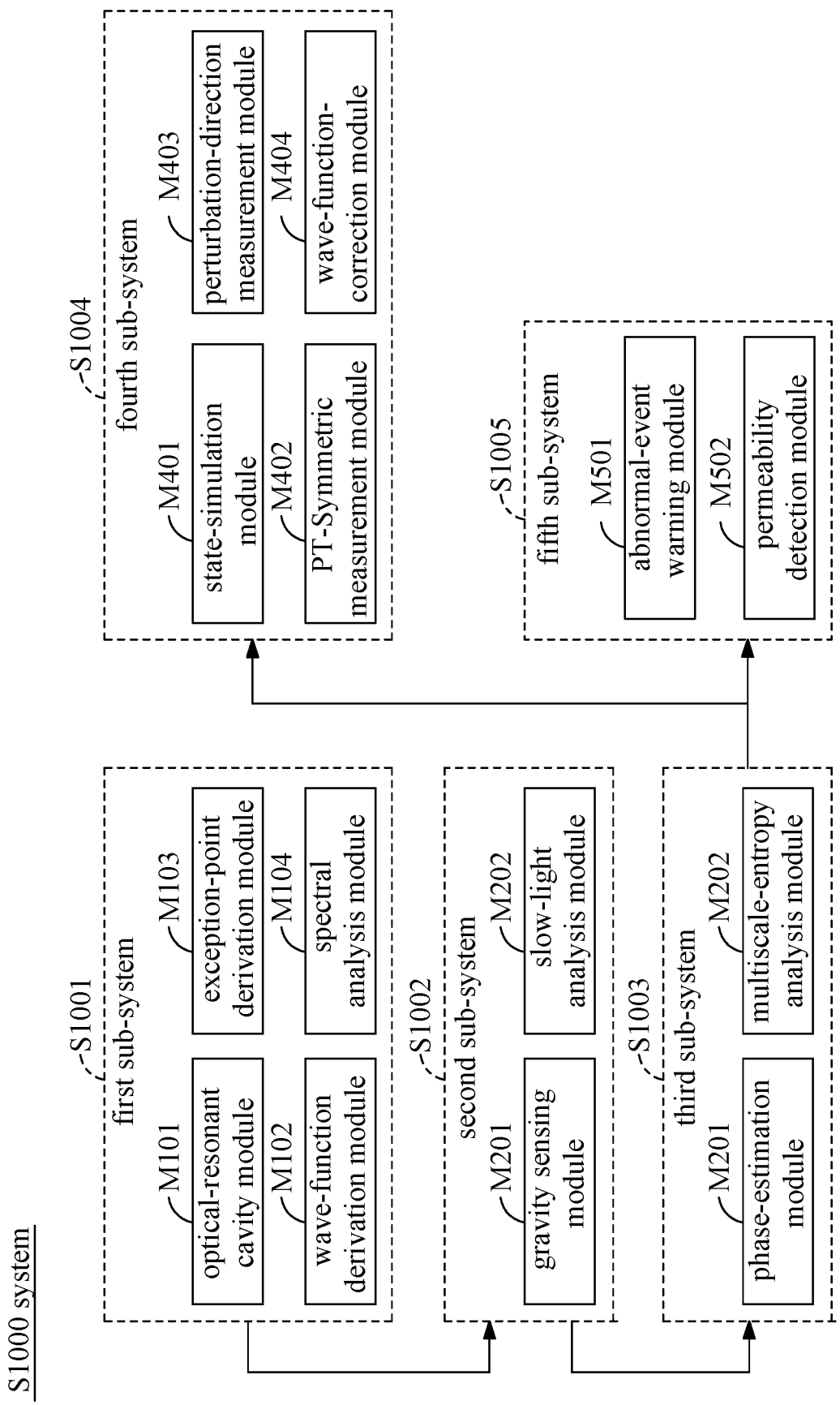
FIG. 1A is a structural block diagram of a system for resisting quantum-perturbation threats to quantum communication devices according to an embodiment of the present invention.

Refer to FIG. 1A, which is a structural block diagram of a system for resisting quantum-perturbation threats to quantum communication devices according to an embodiment of the present invention. In an embodiment, the system for resisting quantum-perturbation threats S1000 includes a first sub-system S1001 as a frequency-spectrum-sensing sub-system, a second sub-system S1002 as a gravity-sensing sub-system, a third sub-system S1003 as a multiscale-entropy analysis sub-system, a fourth sub-system S1004 as an information-correction sub-system, and a fifth sub-system S1005 as an abnormal-event processing sub-system.

Figure 1B:
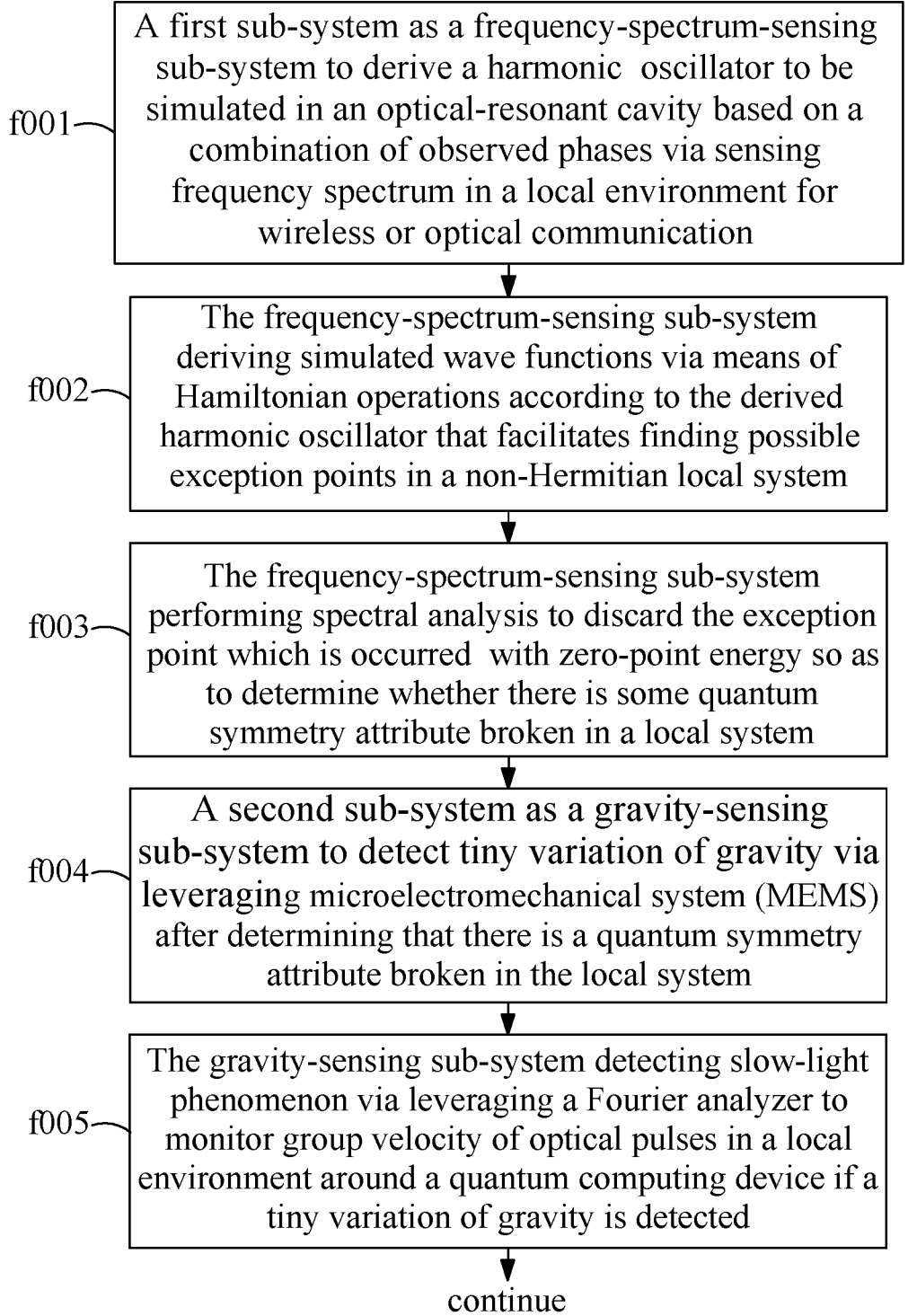
FIG. 1B is a dataflow diagram showing main data flow related to FIG. 1A.
Figure 1C:
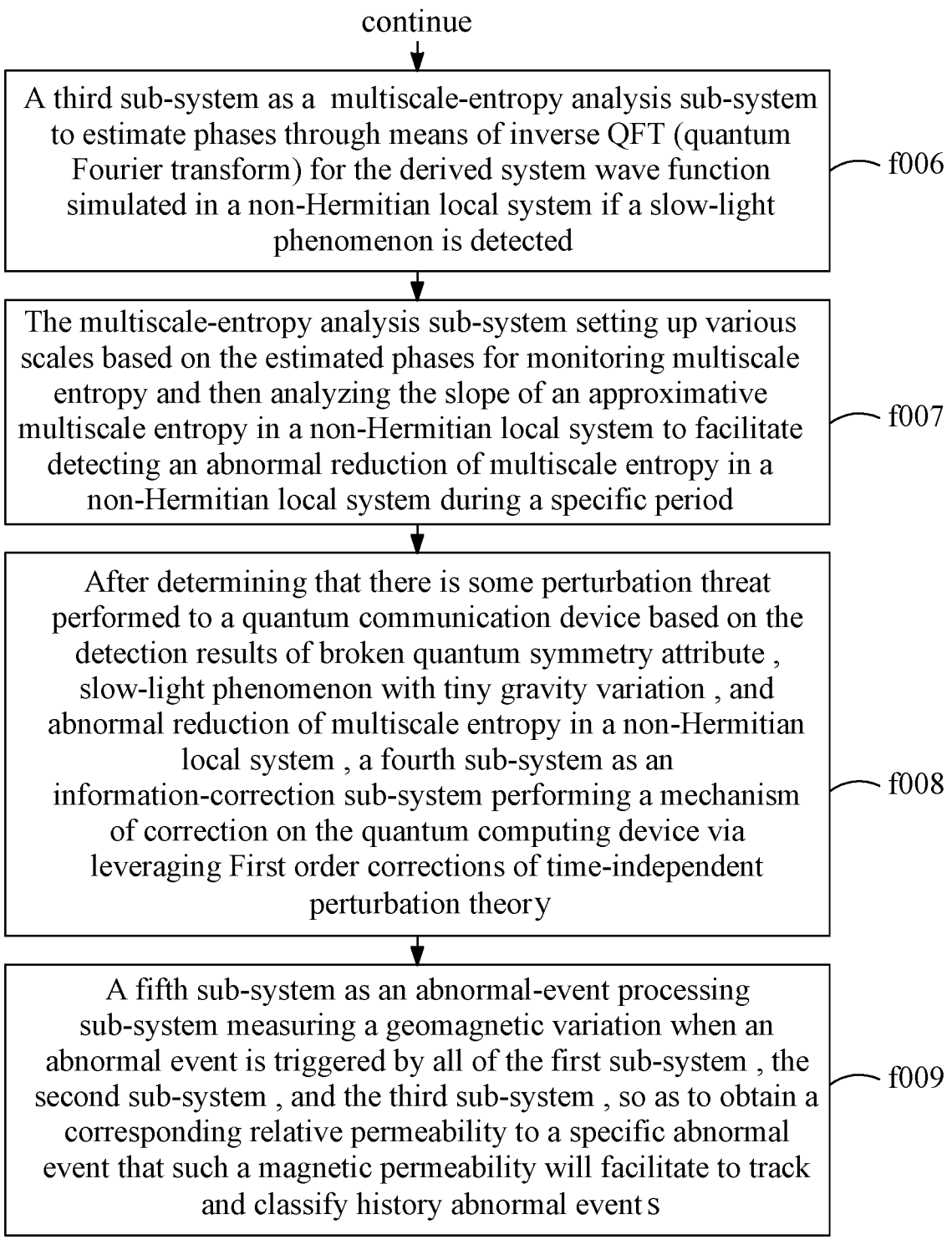
FIG. 1C is a dataflow diagram showing main data flow related to FIG. 1A and a continuation of FIG. 1B.

Also referring to FIG. 1B and FIG. 1C, a main workflow for an implementation of the present invention is shown as block f001~f009 for summarizing the stages of the above-mentioned sub-systems: a) as shown in block f001, a first sub-system S1001 as a frequency-spectrum-sensing sub-system to derive a harmonic oscillator to be simulated in an optical-resonant cavity based on a combination of observed phases via sensing frequency spectrum in a local environment for wireless or optical communication; b) thereafter, as shown in block f002, the frequency-spectrum-sensing sub-system S1001 deriving simulated wave functions via means of Hamiltonian operations according to the derived harmonic oscillator that facilitates finding possible exception points in a non-Hermitian local system; c) moreover, as shown in block f003, the frequency-spectrum-sensing sub-system S1001 coupled to a spectrum analyzer performing spectral analysis to discard the exception point which is occurred with zero-point energy so as to determine whether there is some quantum symmetry attribute broken in a local system; once there is still any exception point after the operation c), the sub-system S1001 will determine that there is some quantum symmetry attribute broken in the local system; d) the next stage, as shown in block f004, a second sub-system S1002 as a gravity-sensing sub-system to detect tiny variation of gravity via leveraging microelectromechanical system (MEMS) after determining that there is a quantum symmetry attribute broken in the local system; e) thereafter, as shown in block f005, the gravity-sensing sub-system S1002 detecting slow-light phenomenon via leveraging a Fourier analyzer to monitor group velocity of optical pulses in a local environment around a quantum computing device if a tiny variation of gravity is detected; f) thereafter, as shown in block f006, a third sub-system S1003 as a multiscale-entropy analysis sub-system to estimate phases through means of inverse quantum Fourier transform (QFT) for the derived system wave function simulated in a non-Hermitian local system if a slow-light phenomenon is detected; g) thereafter, as shown in block f007, the multi-scale-entropy analysis sub-system S1003 setting up various scales based on the estimated phases for monitoring multiscale entropy and then analyzing the slope of an approximative multiscale entropy in a non-Hermitian local system to facilitate detecting an abnormal reduction of multiscale entropy in a non-Hermitian local system during a specific period; h) as shown in block f008, after determining that there is some quantum perturbation threat performed to a quantum communication device based on the detection results of broken quantum symmetry attribute, slow-light phenomenon with tiny gravity variation, and abnormal reduction of multiscale entropy in a non-Hermitian local system, a fourth sub-system S1004 as an information-correction sub-system performing a mechanism of bias correction on the quantum computing device via leveraging First order corrections of time-independent perturbation theory; meanwhile, as shown in block f009, a fifth sub-system S1005 as an abnormal-event processing sub-system measuring a geomagnetic variation when an abnormal event is triggered by all of the first sub-system S1001, the second sub-system S1002, and the third sub-system S1003, so as to obtain a corresponding relative permeability to a specific abnormal event that such a magnetic permeability will facilitate to track and classify history abnormal events. Thus, the system S1000 will achieve the effect of resisting quantum perturbation threats to a quantum communication device.

Figure 2:
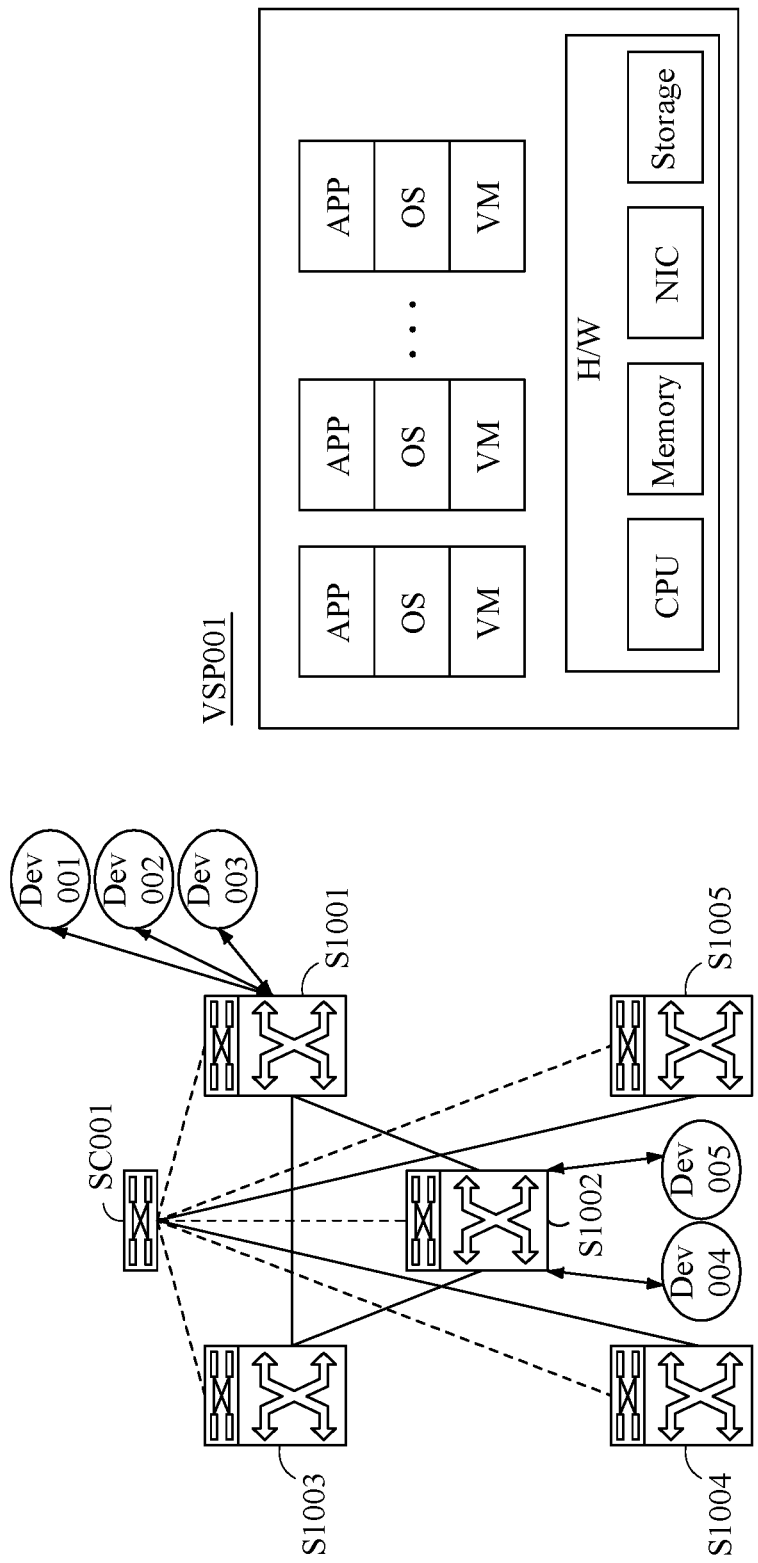
FIG. 2 is a schematic diagram of a user scenario according to an embodiment of FIG. 1A.

Referring to FIG. 2 for example, as a role of a perturbation-threat resistant system for a transceiver node in a quantum communication environment, it is usually a system established as a virtualized service platform VSP001 in a server room including some sub-systems (such as S1001~S1004) implemented as different VMs (virtual machines) in a cloud platform VSP001 which collaborates with specific apparatuses (such as Dev001~Dev005) for measuring or sensing some required observations so as to detect the target quantum-perturbation threat. For some advanced requirements, the system further implements more sub-systems such as S1004 for correcting quantum computing bias, and such as S1005 for tracking and classifying detected quantum perturbation threats. Hence, as a cybersecurity implementation, the related sub-systems should be working together in the embodiments of the present invention, and the elements (could be modules or coupled devices) in each sub-system may be leveraged across different sub-systems (the inter-operation will be illustrated in the following descriptions).

In the present disclosure, a sub-system (or a module) generally means implementations including a set of loadable instructions with coded algorithms stored in non-volatile rewriteable memory (for example, NAND Flash, SSD, and so on) to perform software subroutines, programming logics, or firmware applications, and so on. Thus, an embodiment based on the above consideration is to implement the related sub-systems (S1001~S1005) as a quantum cyber-security service VSP001 operating with a plurality of VMs working with required apparatuses for use in radio wave sensing, oscillator simulation, spectral analysis, gravity sensing, and so on. Wherein, the apparatuses are located in a space for transceivers of quantum communication and the system S1000 adopts software definition network (SDN) with a software controller SC001 as the network infrastructure for internal communications. Implementing the present invention with the virtualized server platform (VSP), each sub-system can bundle a virtual machine (VM) with a specified OS and a set of APP applications individually; here the APP mentioned in the VSP can be software applications, software development libraries, programming codes, etc. In addition, the above embodiments are only feasible examples for illustrating a user scenario of the present invention, and the implementation and deployment of the present invention is not limited thereto.

Figure 3A:
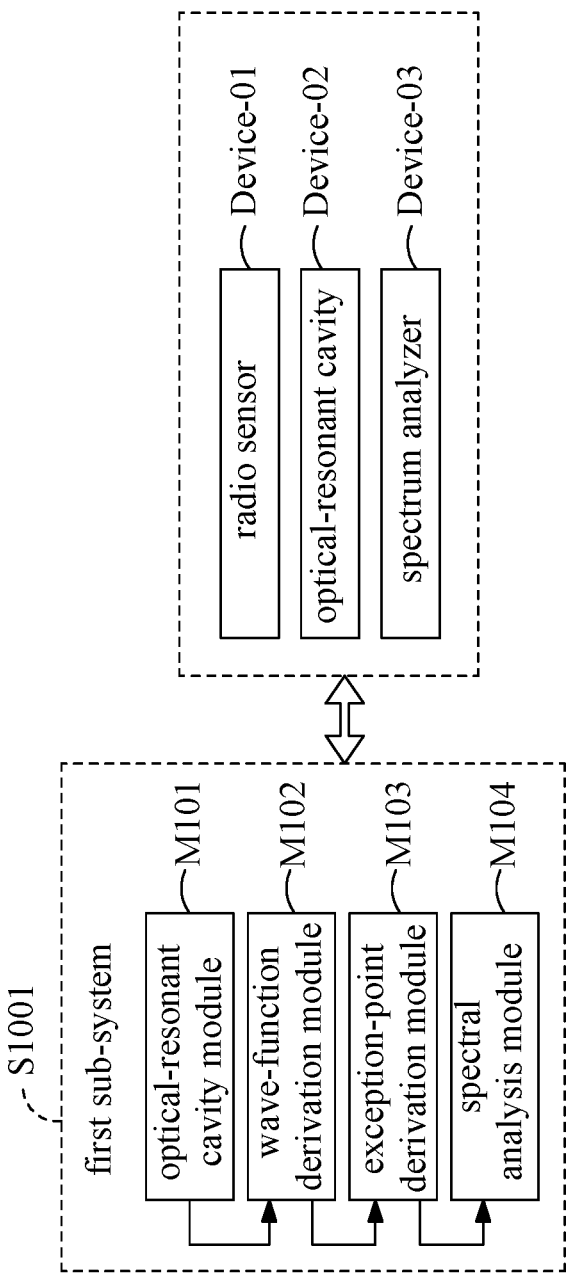
FIG. 3A is a structural block diagram of the first sub-system according to an embodiment of the present invention.

Referring to FIG. 3A, in an embodiment, the first sub-system S1001 collaborating with a radio sensor Device-01, an optical-resonant cavity Device-02, and a spectrum analyzer Device-03 performs frequency-spectrum sensing-and-analyzing operations for a non-Hermitian system, wherein the frequency-spectrum sensing-and-analyzing operations comprise: 1) deriving a harmonic oscillator to be simulated in the optical-resonant cavity based on a combination of observed phases via sensing frequency spectrum in a local environment for wireless or optical communication; 2) deriving simulated wave functions via means of Hamiltonian operations according to the derived harmonic oscillator that facilitates finding possible exception points in a non-Hermitian local system; and 3) performing spectral analysis with the spectrum analyzer to discard the exception point which is occurred with zero-point energy so as to determine whether there is some quantum symmetry attribute broken in a local system.

Still referring to FIG. 3A, in order to implement the above operations, in an embodiment, the first sub-system S1001 can implement the following modules as instruction sets for performing the related operations: a) an optical-resonant cavity module M101 which derives a harmonic oscillator, and works with the radio sensor Device-01 to make the oscillator be simulated in the optical-resonant cavity Device-02 based on a combination of phases observed from the sensed frequency spectrum; b) thereafter, through means of Hamiltonian operations, a wave-function derivation module M102 deriving simulated wave functions according to the derived harmonic oscillator; c) thereafter, implementing an exception-point derivation module M103 for deriving possible exception points of a non-Hermitian system according to the derived simulated wave functions; and d) furthermore, having an spectral analysis module M104 to drive the spectrum analyzer Device-03 to perform spectral analysis for discarding the exception point which is occurred with zero-point energy. Once there is still any exception point after the above operations, the first sub-system S1001 will determine that there is some quantum symmetry attribute broken in a local system. The above computing modules and operations can be implemented, based on relevant technology, as a software unit, hardware unit, or a combination of software and hardware units. However, integrating the above modules as a frequency-spectrum-sensing sub-system, comes out of a synergy that facilitates finding the cases where there may exist bias on some result of quantum computing due to some quantum symmetry attribute broken in a local system. Meanwhile, based on the native features of exception points, such found cases may also imply that some quantum states and spin attributes in use had been detected by some external group, and this is an effect that the conventional technologies cannot achieve.

Figure 3B:
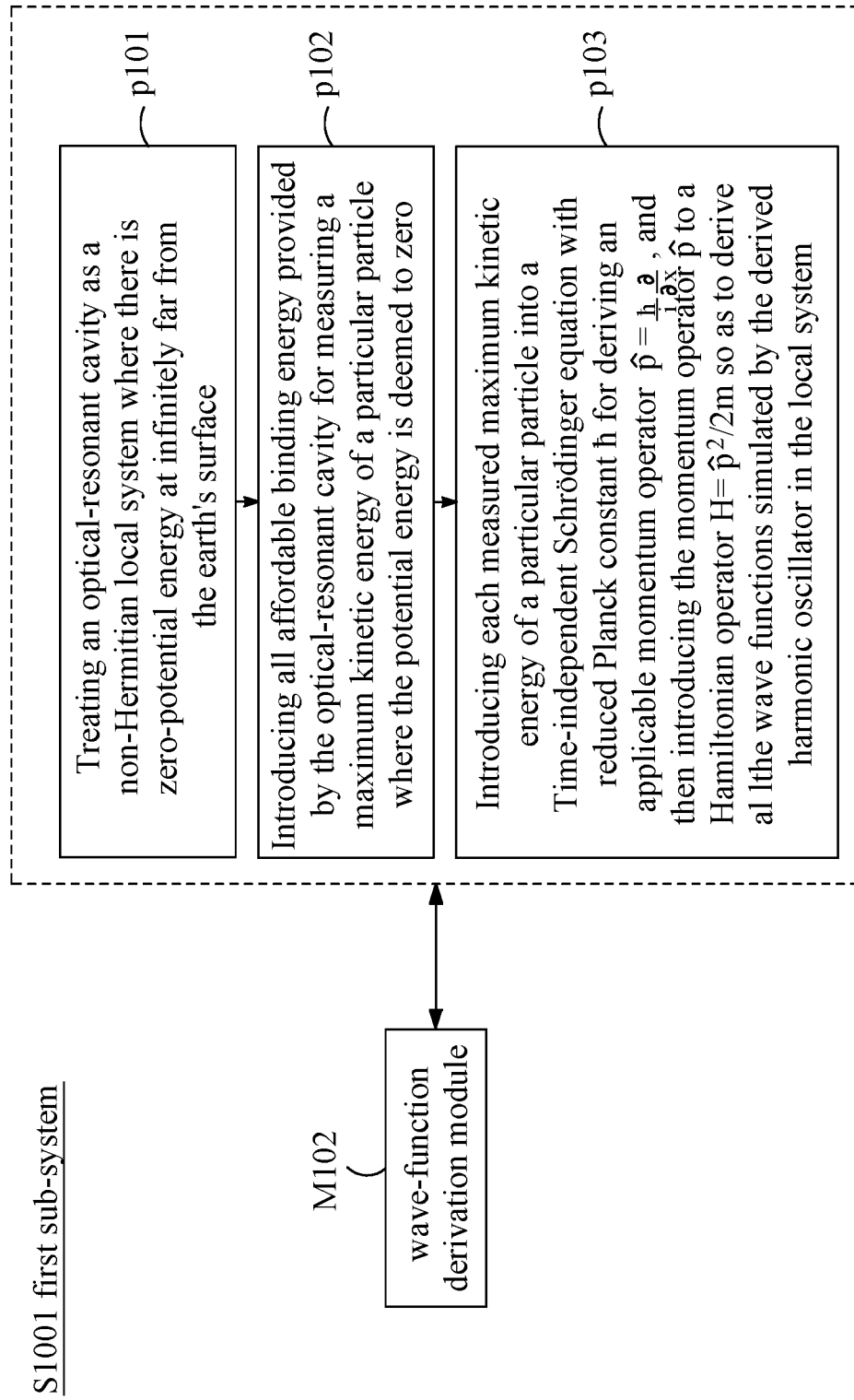
FIG. 3B is a dataflow diagram continuation of FIG. 3A showing partial data flow related to a wave-function derivation module.

Also referring to FIG. 3B, in an embodiment, in order to derive simulated wave functions in efficiency, the above-mentioned means of Hamiltonian operations performed by the wave-function derivation module M102 comprise: 1) shown as block p101, treating an optical-resonant cavity Device-02 as a non-Hermitian local system where there is zero-potential energy at infinitely far from the earth's surface; 2) shown as block p102, introducing all affordable binding energy provided by the optical-resonant cavity Device-02 for measuring a maximum kinetic energy of a particular particle where the potential energy is deemed to be zero; and 3) shown as block p103, introducing each measured maximum kinetic energy of a particular particle into a Time-independent Schrödinger equation with reduced Planck constant h for deriving an applicable momentum operator $$\hat{p} = \frac{\hbar}{i} \frac{\partial}{\partial x},$$

and then introducing the momentum operator $\hat{p}$ to a Hamiltonian operator $H=\hat{p}^2/2\,m$ so as to derive all the wave functions simulated by the derived harmonic oscillator in the local system.

Figure 4:
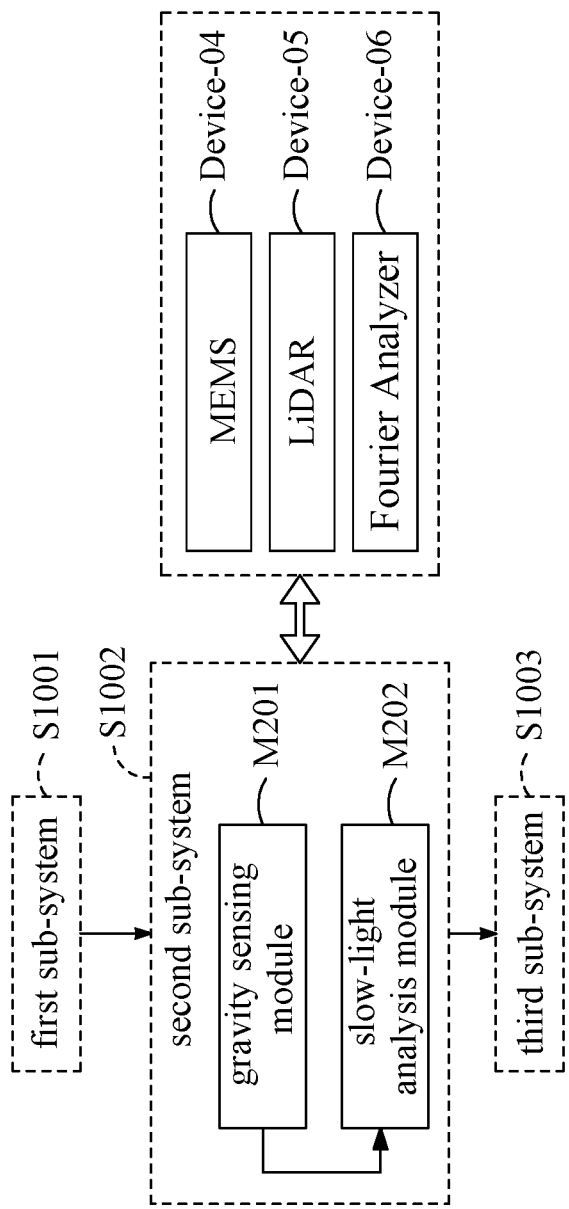
FIG. 4 is a structural block diagram of the second sub-system according to an embodiment of the present invention.

Referring to FIG. 4, in an embodiment, the above-mentioned second sub-system S1002 coupled to the first sub-system S1001 collaborates with a microelectromechanical system (MEMS) Device-04, a LiDAR (light detection and ranging) Device-05 and a Fourier Analyzer Device-06 to perform gravity sensing-and-analyzing operations for finding cases with impacted quantum phases, wherein the gravity sensing-and-analyzing operations comprise: 1) detecting a tiny variation of gravity via leveraging a MEMS Device-04 after the first sub-system S1001 determining that there is a quantum symmetry attribute broken in the local system; and 2) detecting slow-light phenomenon via leveraging a Fourier Analyzer Device-06 collaborating with a LiDAR Device-05 to monitor group velocity of optical pulses in a local environment around a quantum computing device if a tiny variation of gravity is detected.

Still referring to FIG. 4, in order to implement the above-mentioned gravity sensing-and-analyzing operations, in an embodiment, the second sub-system S1002 can implement the following modules as instruction sets for performing the related operations: a) a gravity sensing module M201 collaborating a quantum MEMS Device-04 (such as Wee-G, a gravimeter developed by University of Glasgow) for detecting a tiny variation of gravity; and b) once a tiny variation of gravity is found in a local environment, driving a slow-light analysis module M202 coupled to a LiDAR Device-05 and a Fourier Analyzer Device-06 to monitor group velocity of optical pulses in a local environment around a quantum computing device so as to confirm whether there is slow-light phenomenon in the local environment. Once the second sub-system S1002 confirms that there is a tiny variation of gravity meanwhile the group velocity of optical pulses is slowed down, it implies the local quantum communication environment may be disturbed by some external factor. Combining these modules in an implementation of software, hardware, or a combination of software and hardware as a gravity-sensing sub-system not only provides an advanced sifter for abnormal cases but also provides a detector solution to find cases which may relate to a threat with a vortex electric field. This is an effect that the conventional technologies cannot achieve.

Figure 5:
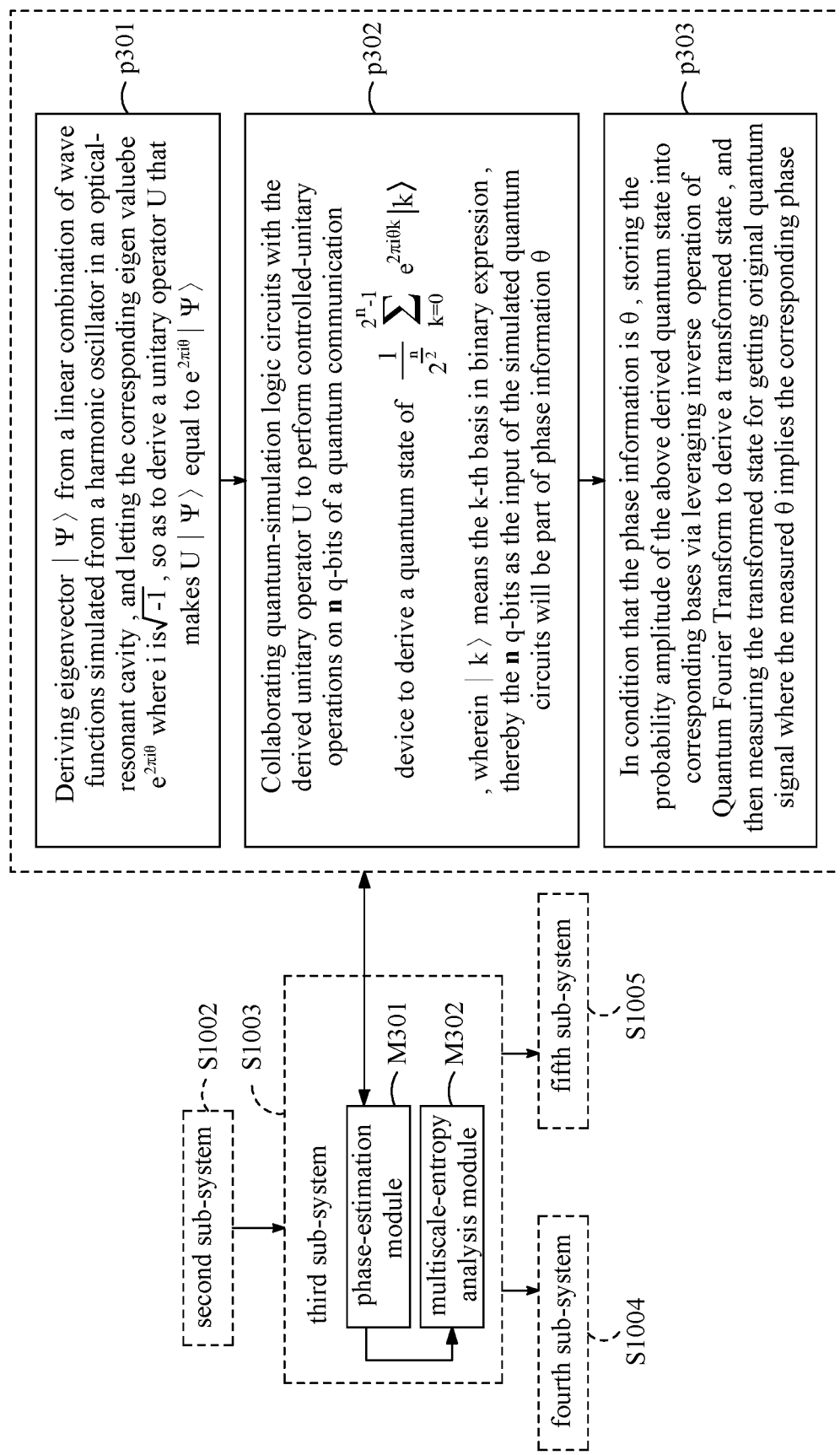
FIG. 5 is a structural block diagram with partial data flow of the third sub-system according to an embodiment of the present invention.

Referring to FIG. 5, in an embodiment, the above-mentioned third sub-system S1003 performs estimation-and-analysis operations for detecting an abnormal reduction of multiscale entropy in a non-Hermitian local system during a specific period, wherein the estimation-and-analysis operations comprise: 1) estimating phases through means of inverse quantum Fourier transform (QFT) for the derived system wave function simulated in a non-Hermitian local system if a slow-light phenomenon is detected; and 2) setting up various scales based on the estimated phases for monitoring multiscale entropy and then analyzing the slope of an approximative multiscale entropy in a non-Hermitian local system to facilitate detecting an abnormal reduction of multiscale entropy in a non-Hermitian local system during a specific period.

Still referring to FIG. 5, in order to implement the above-mentioned estimation-and-analysis operations, in an embodiment, the third sub-system S1003 can implement the following modules as instruction sets for performing the related operations: a) a phase-estimation module M301 for estimating the phase information through means of inverse QFT for a system wave function observed in non-Hermitian local system; b) after the phase-estimation module M301 providing estimated phase, having a multiscale-entropy analysis module M302 to setup various scales according to the estimated phase for monitoring multiscale entropy and analyzing the slope of an approximative multiscale entropy so as to determine whether there is an abnormal reduction of multiscale entropy in a non-Hermitian local system during a specific period. Combining these modules in an implementation of software, hardware, or a combination of software and hardware as a multiscale-entropy analysis sub-system not only provides an advanced sifter for abnormal cases caused by external hits but also facilitates finding some cases which may relate to unqualified photon transmission. This is an effect that the conventional technologies cannot achieve.

Furthermore, in the same embodiment, as block p301~block p303 shown in FIG. 5, in order to facilitate estimating optical phases, the above-mentioned means of inverse QFT performed by the phase-estimation module M301 comprises: 1) shown as block p301, deriving eigenvector $\rangle$ from a linear combination of wave functions simulated from a harmonic oscillator in an optical-resonant cavity Device-01, and letting the corresponding eigenvalue be $e^{2\pi i\theta}$ where i is $\sqrt{-1}$, so as to derive a unitary operator U that makes $U|\Psi\rangle$ equal to $e^{2\pi i\theta}|\Psi\rangle$; 2) shown as block p302, collaborating quantum-simulation logic circuits with the derived unitary operator U to perform controlled-unitary operations on n q-bits of a quantum communication device to derive a quantum state of $$\frac{1}{2^{\frac{n}{2}}}\sum_{k=0}^{2^n-1}e^{2\pi i\theta k}|k\rangle_1,$$

wherein $k\rangle$ means the k-th basis in binary expression, thereby the n q-bits as the input of the simulated quantum circuits will be part of phase information $\theta$; and 3) shown as block p303, in condition that the phase information is $\theta$, storing the probability amplitude of the above derived quantum state into corresponding bases via leveraging inverse operation of a Quantum Fourier Transform to derive a transformed state, and then measuring the transformed state for getting an original quantum signal where the measured $\theta$ implies the corresponding phase.

Figure 6A:
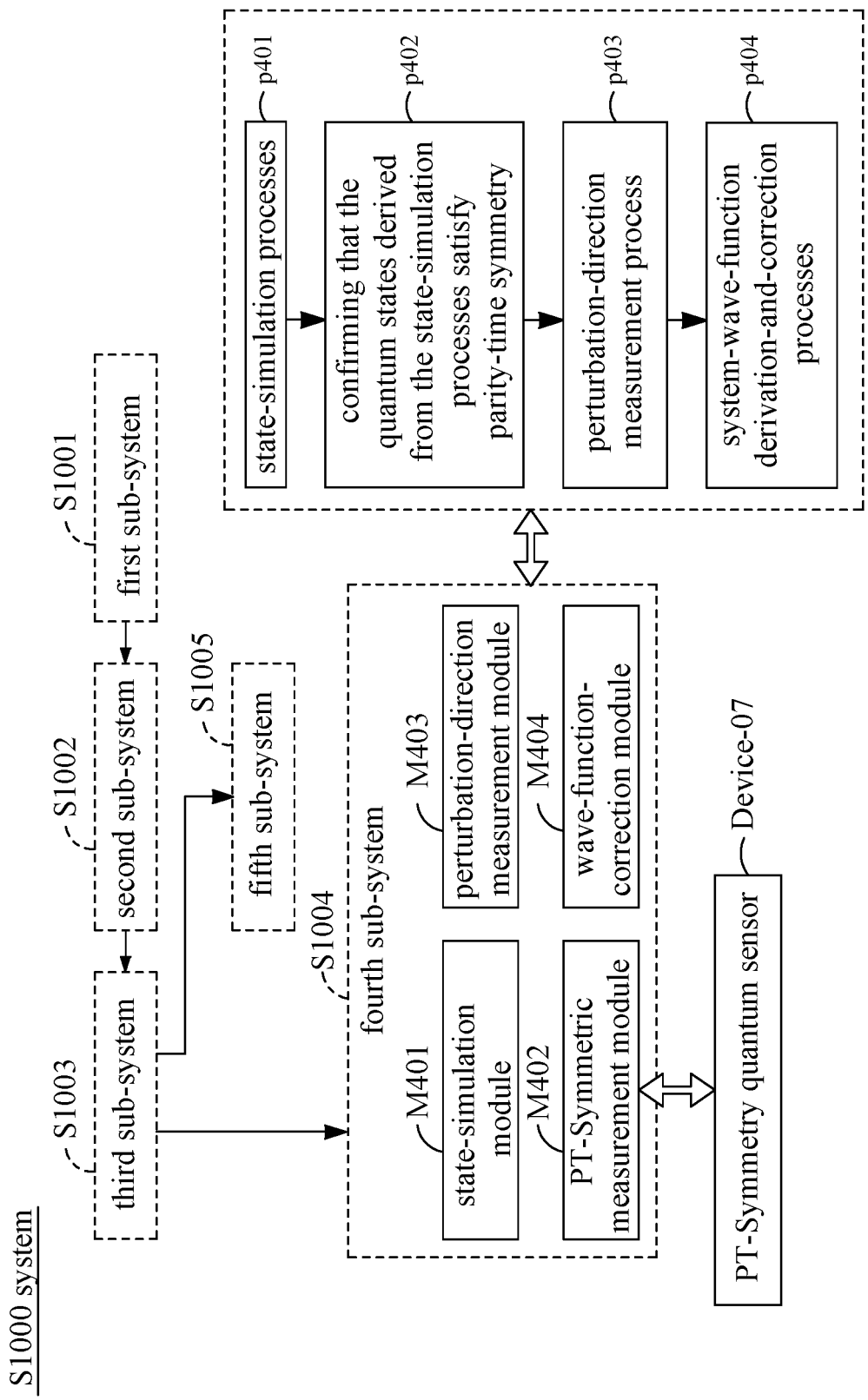
FIG. 6A is a structural block diagram with data flow of the fourth sub-system according to an embodiment of the present invention.

Referring to FIG. 6A, in an embodiment, the system S1000 determines that there should be a quantum perturbation threat to the quantum communication device when all of the first sub-system S1001, the second sub-system S1002, and the third sub-system S1003 report abnormal events; and then the system S1000 drives a fourth sub-system S1004 coupled to a parity-time symmetry (PT-symmetry) quantum sensor Device-07 to perform a mechanism of bias correction on the quantum communication device so as to resist impacts of the quantum perturbation threat. Wherein the mechanism of bias correction on the quantum computing device comprises the following operations: 1) setting up a parameter space based on a found exception point in a non-Hermitian system; 2) simulating to introduce complete corresponding parameters of the parameter space clockwise so as to derive a quantum state; 3) simulating to introduce complete corresponding parameters of the parameter space counterclockwise so as to derive another quantum state; 4) confirming the above two derived quantum states satisfy parity-time symmetry; 5) deriving an expected direction where a perturbation shall come according to the corresponding non-orthogonal bases from the derived quantum states satisfying parity-time symmetry, and determining whether the observed direction where a perturbation comes fits the expected direction via making use of a PT-symmetry quantum sensor Device-07; 6) once the operation 4) confirmed that the above two derived quantum states satisfy parity-time symmetry and the operation 5) also determined that the observed direction where a perturbation came was not in expectation, the states derived from the parameter space will be treated as corrected quantum states in a local system, otherwise the system will stop the current quantum communication; and 7) making use of the corrected states to derive a corresponding system wave function via the Schrödinger equation, and the performing First order corrections of time-independent perturbation theory based on the derived system wave function. Shown as block p401~block p404 in FIG. 6A, wherein, the above-mentioned operations 1)~3) are deemed to state-simulation processes (shown as p401) hereafter; the above-mentioned operation 5) is deemed to a perturbation-direction measurement process (shown as p403) hereafter; and the above-mentioned operations 6)~7) are deemed to system-wave-function derivation-and-correction processes (shown as p404) hereafter.

Still referring to FIG. 6A, in order to implement the above-mentioned mechanism of bias correction, in an embodiment, the fourth sub-system S1004 can implement the following modules as instruction sets for performing the related operations: a) a state-simulation module M401 for performing state-simulation processes p401 to get applicable states based on the exception points derived from the first sub-system S1001; b) thereafter, shown as block p402, the PT-Symmetric measurement module M402 confirming that the derived states based on the exception points satisfy parity-time symmetry; c) thereafter a perturbation-direction measurement module M403 coupled to a PT-symmetry quantum sensor Device-07 for confirming that a measured direction of the perturbation is not in expectation based on an exception point through a perturbation-direction measurement process p403; and d) finally, the wave-function-correction module M404 performing system-wave-function derivation-and-correction processes p404 which derive a corresponding system wave-function based on the applicable states derived from the state-simulation module M401 so as to perform First order corrections of time-independent perturbation theory based on the derived system wave-function. In the field of quantum communication, it is a problem that an external perturbation may lead to cyber-security issues such as deviations in state measurement or phasing estimation, frequent re-transmissions, and asynchronous receiving issues. Thus, combining these modules in an implementation of software, hardware, or a combination of software and hardware as an information-correction sub-system not only provides a bias correction mechanism for broken quantum information stroked by external perturbation or caused by unqualified optical source for quantum communication, but also facilitates extending transmission scale for conventional quantum key distribution (QKD) solutions. This is an effect that the conventional technologies cannot achieve.

Figure 6B:
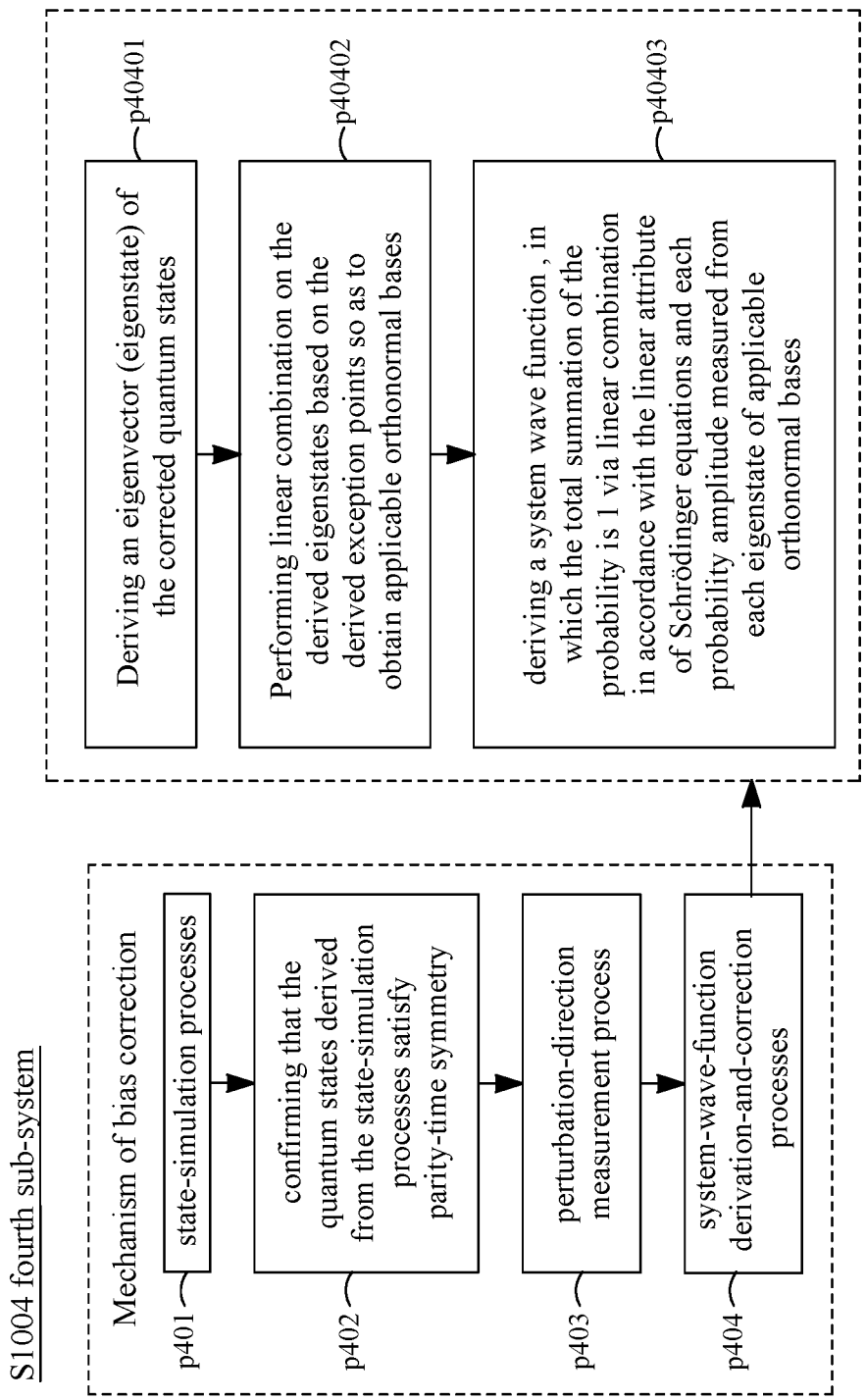
FIG. 6B is a data flow diagram of the fourth sub-system according to an embodiment of the present invention.

Also referring to FIG. 6B, in some embodiments, in order to make use of the corrected states to derive a corresponding system wave function via the Schrödinger equation, the above-mentioned system-wave-function derivation-and-correction processes p404 further comprise the following operations: 1) shown as block p40401, deriving an eigenvector (eigenstate) of the corrected quantum states; 2) shown as block p40402, performing linear combination on the derived eigenstates based on the derived exception points so as to obtain applicable orthonormal bases; and 3) shown as block p40403, deriving a system wave function, in which the total summation of the probability is 1 via linear combination in accordance with the linear attribute of Schrödinger equations and each probability amplitude measured from each eigenstate of applicable orthonormal bases.

Figure 7:
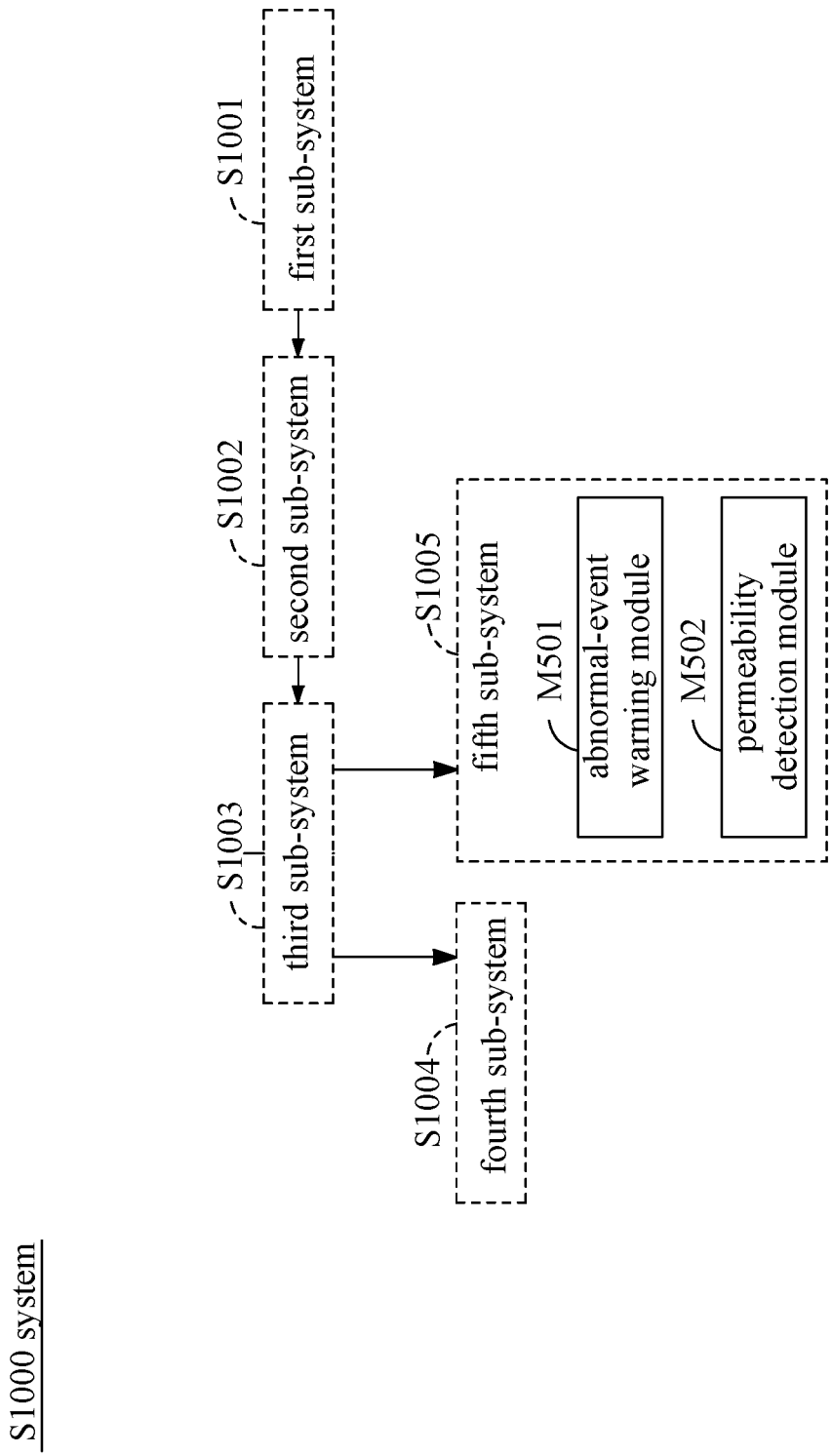
FIG. 7 is a structural block diagram of the fifth sub-system according to an embodiment of the present invention.

Referring to FIG. 7, meanwhile, in an embodiment, according to the outputs reported by the first sub-system S1001, the second sub-system S1002, and the third sub-system S1003, once the system S1000 determines that there should be a quantum-perturbation threat to the quantum communication device, in order to facilitate tracking and classifying history abnormal events, the following abnormal-event tagging operations will be performed by a fifth sub-system S1005: 1) measuring a geomagnetic variation so as to obtain a corresponding permeability; 2) transforming the obtained permeability to a relative permeability so as to be a featured parameter; and 3) tracking and classifying the history abnormal events in accordance with such a featured parameter.

Still referring to FIG. 7, in order to implement the above-mentioned abnormal-event tagging operations, in an embodiment, the fifth sub-system S1005 can implement the following modules as instruction sets for performing the related operations: a) an abnormal-event warning module M501 for reporting triggered abnormal events to a system administrator for further reactions; and b) a permeability detection module M502 measuring a geomagnetic variation when an abnormal event is triggered by all of the first sub-system S1001, the second sub-system S1002, and the third sub-system S1003, so as to obtain a corresponding relative permeability to a specific abnormal event. Combining these modules in an implementation of software, hardware, or a combination of software and hardware as an abnormal-event processing sub-system for leveraging such a magnetic permeability will facilitate to track and classify history abnormal events.

Thereby, the above embodiments of the present invention support to implement a system for resisting quantum perturbation threats to a quantum communication device. The present invention provides a complete architecture of quantum-perturbation threat resistance for general quantum communication environments. This technology can be implemented on a transceiver or a cloud service platform meanwhile collaborating with apparatuses for sensing and measuring specific weak variation in a local non-Hermitian system. By the way, the mentioned "quantum perturbation threat" in the present invention is not limited to mean a malicious hit from some external attacker group. That is, possibly caused by transmission issues related to unqualified optical sources as well. In some embodiments, this technology not only detects quantum perturbation threats and performs bias correction mechanism, but is also optional to implement the abnormal-event processing sub-system. In addition, the relevant technical means of this system can be practiced by devices working in general environments, and also provides several effects of a quantum cyber-security mechanism that cannot be supported by the current PQC or QKD schemes for use in a large-scale quantum communication.

While the present disclosure has been described by means of specific embodiments, numerous modifications and variations could be made thereto by those skilled in the art without departing from the scope and spirit of the present disclosure set forth in the claims.

What is claimed is:

1. A system for resisting quantum perturbation threats to quantum communication devices, the system comprising: at least one processing unit, at least one memory coupled to the at least one processing unit, and
   a) a first sub-system, for sensing a frequency spectrum related to wireless or optical communication to determine whether there is a quantum symmetry attribute broken in a local system, the first sub-system including:
      1) an optical-resonant cavity module for deriving a harmonic oscillator to be simulated in an optical-resonant cavity based on a combination of phases observed from the sensed frequency spectrum;
      2) a wave-function derivation module for deriving simulated wave functions according to the derived harmonic oscillator;

3) an exception-point derivation module for deriving possible exception points of a non-Hermitian system according to the derived simulated wave functions; and
4) a spectral analysis module for performing spectral analysis to discard the exception point which is occurred with zero-point energy;

b) a second sub-system, coupled to the first sub-system, for detecting tiny variation of gravity and slow-light phenomenon in a local environment when the first sub-system determines that there is a broken quantum symmetry attribute; and c) a third sub-system, coupled to the second sub-system, for detecting an abnormal reduction of multiscale entropy in a non-Hermitian local system during a specific period when the second sub-system determines that there is tiny variation of gravity and slow-light phenomenon in the local environment;

wherein the system determines that there should be a quantum perturbation threat to the quantum communication device when all of the first sub-system, the second sub-system, and the third sub-system report abnormal events; and then the system performs a mechanism of bias correction on the quantum communication device so as to resist impacts of the quantum perturbation threat.

2. The system for resisting quantum perturbation threats to quantum communication devices according to claim 1, wherein in order to facilitate detecting tiny variation of gravity and slow-light phenomenon in the local environment, the second sub-system further comprises:
a) a gravity sensing module for detecting tiny variation of gravity via leveraging microelectromechanical system (MEMS); and
b) a slow-light analysis module for detecting slow-light phenomenon via leveraging a Fourier analyzer to monitor group velocity of optical pulses in the local environment around a quantum computing device.

3. The system for resisting quantum perturbation threats to quantum communication devices according to claim 1, wherein in order to facilitate detecting an abnormal reduction of multiscale entropy in a non-Hermitian local system during a specific period, the third sub-system further comprises:
a) a phase-estimation module which estimates the phase information for a system wave function observed in a non-Hermitian local system; and
b) a multiscale-entropy analysis module which sets up various scales according to the estimated phase for monitoring multiscale entropy and analyzing the slope of an approximative multiscale entropy in a non-Hermitian local system.

4. The system for resisting quantum perturbation threats to quantum communication devices according to claim 1, wherein in order to perform a mechanism of bias correction on the quantum communication device, the system further comprises a fourth sub-system comprising:
a) a state-simulation module for performing simulation processes to get applicable states based on the exception points derived from the first sub-system;
b) a PT-Symmetric measurement module to confirm that the derived states based on the exception points satisfy parity-time symmetry;
c) a perturbation-direction measurement module for confirming that a measured direction of the perturbation is not in expectation based on an exception point; and
d) a wave-function-correction module for deriving a corresponding system wave-function based on the applicable states derived from the state-simulation module, thereby performing First order corrections of time-independent perturbation theory based on the derived system wave-function.

5. The system for resisting quantum perturbation threats to quantum communication devices according to claim 1, wherein in order to launch abnormal events and tag the launched abnormal events for further tracking, the system further comprises a fifth sub-system comprising:
a) an abnormal-event warning module for reporting triggered abnormal events to a system administrator; and
b) a permeability detection module for measuring a geomagnetic variation when an abnormal event is triggered by all of the first sub-system, the second sub-system, and the third sub-system, so as to obtain a corresponding relative permeability to a specific abnormal event that such a magnetic permeability will facilitate to track and classify history abnormal events.

6. A method for resisting quantum perturbation threats to quantum communication devices, the method comprising the following processes:
a) deriving a harmonic oscillator to be simulated in an optical-resonant cavity based on a combination of observed phases via sensing a frequency spectrum in a local environment for wireless or optical communication;
b) deriving simulated wave functions via means of Hamiltonian operations according to the derived harmonic oscillator that facilitates finding possible exception points in a non-Hermitian local system;
c) performing spectral analysis to discard the exception point which is occurred with zero-point energy so as to determine whether there is a quantum symmetry attribute broken in a local system;
d) detecting tiny variation of gravity via leveraging microelectromechanical system (MEMS) after determining that there is a quantum symmetry attribute broken in the local system;
e) detecting slow-light phenomenon via leveraging a Fourier analyzer to monitor group velocity of optical pulses in a local environment around a quantum computing device if a tiny variation of gravity is detected;
f) estimating phases through means of inverse quantum Fourier transform (QFT) for the derived system wave function simulated in a non-Hermitian local system if a slow-light phenomenon is detected;
g) setting up various scales based on the estimated phases for monitoring multiscale entropy and then analyzing the slope of an approximative multiscale entropy in a non-Hermitian local system to facilitate detecting an abnormal reduction of multiscale entropy in a non-Hermitian local system during a specific period;
h) determining that there is a candidate quantum perturbation threat performed to a quantum communication device based on the detection results of broken quantum symmetry attribute, slow-light phenomenon with tiny gravity variation, and abnormal reduction of multiscale entropy in a non-Hermitian local system; and
i) performing a mechanism of bias correction on the quantum computing device via leveraging First order corrections of time-independent perturbation theory after determining that there is a quantum perturbation threat to quantum communication devices.

7. The method for resisting quantum perturbation threats to quantum communication devices according to claim 6, wherein in order to derive simulated wave functions according to the derived harmonic oscillator, the means of Hamiltonian operations comprise:
   a) treating an optical-resonant cavity as a non-Hermitian local system where there is zero-potential energy at infinitely far from earth's surface;
   b) introducing all affordable binding energy provided by the optical-resonant cavity for measuring a maximum kinetic energy of a particular particle where the potential energy is deemed to zero; and
   c) introducing each measured maximum kinetic energy of a particular particle into a Time-independent Schrödinger equation with reduced Planck constant h for deriving an applicable momentum operator $$\hat{p} = \frac{\hbar}{i} \frac{\partial}{\partial x},$$

and then introducing the momentum operator $\hat{p}$ to a Hamiltonian operator $H=\hat{p}^2/2\,m$ so as to derive all the wave functions simulated by the derived harmonic oscillator in the local system.

8. The method for resisting quantum perturbation threats to quantum communication devices according to claim 6, wherein in order to facilitate estimating optical phases, the means of inverse QFT comprises:
   a) deriving eigenvector $|\Psi\rangle$ from a linear combination of wave functions simulated from a harmonic oscillator in an optical-resonant cavity, and letting the corresponding eigenvalue be $e^{2\pi i\theta}$ where i is $\sqrt{-1}$, so as to derive a unitary operator U that makes $U|\Psi\rangle$ equal to $e^{2\pi i\theta}|\Psi\rangle$;
   b) collaborating quantum-simulation logic circuits with the derived unitary operator U to perform controlled-unitary operations on n q-bits of a quantum communication device to derive a quantum state of $$\frac{1}{2^{\frac{n}{2}}} \sum_{k=0}^{2^n-1} e^{2\pi i\theta k} |k\rangle_1,$$

wherein $|k\rangle$ means the k-th basis in binary expression, thereby the n q-bits as the input of the simulated quantum circuits will be part of phase information θ; and
   c) in condition that the phase information is θ, storing the probability amplitude of the above derived quantum state into corresponding bases via leveraging inverse operation of Quantum Fourier Transform to derive a transformed state, and then measuring the transformed state for getting an original quantum signal where the measured θ implies the corresponding phase.

9. The method for resisting quantum perturbation threats to quantum communication devices according to claim 6, wherein the mechanism of bias correction on the quantum computing device comprises:
   a) setting up a parameter space based on a found exception point in a non-Hermitian system;
   b) simulating to introduce complete corresponding parameters of the parameter space clockwise so as to derive a quantum state;
   c) simulating to introduce complete corresponding parameters of the parameter space counterclockwise so as to derive another quantum state;
   d) confirming the above two derived quantum states satisfy parity-time symmetry;
   e) deriving an expected direction where a perturbation shall come according to the corresponding non-orthogonal bases from the derived quantum states satisfying parity-time symmetry, and determining whether the observed direction where a perturbation comes fits the expected direction via making use of a PT-symmetry quantum sensor;
   f) once the operation d) confirmed that the above two derived quantum states satisfy parity-time symmetry and the operation e) also determined that the observed direction where a perturbation came was not in expectation, the states derived from the parameter space will be treated as corrected quantum states in a local system, otherwise the system will stop the current quantum communication; and
   g) making use of the corrected states to derive a corresponding system wave function via Schrödinger equation, and then performing First order corrections of time-independent perturbation theory based on the derived system wave function.

10. The method for resisting quantum perturbation threats to quantum communication devices according to claim 9, wherein in order to make use of the corrected states to derive a corresponding system wave function, the method further comprises:
   a) deriving an eigenvector (eigenstate) of the corrected quantum states;
   b) performing linear combination on the derived eigenstates based on the derived exception points so as to obtain applicable orthonormal bases; and
   c) deriving a system wave function, in which the total summation of the probability is 1 via linear combination in accordance with the linear attribute of Schrödinger equations and each probability amplitude measured from each eigenstate of applicable orthonormal bases.

11. The method for resisting quantum perturbation threats to quantum communication devices according to claim 6, wherein once an operation determines that there is a candidate quantum perturbation threat performed to a quantum communication device based on the detection results of broken quantum symmetry attribute, slow-light phenomenon with tiny gravity variation, and abnormal reduction of multiscale entropy in a non-Hermitian local system, in order to facilitate tracking and classifying history abnormal events, the following operations will be performed:
   a) measuring a geomagnetic variation so as to obtain a corresponding permeability;
   b) transforming the obtained permeability to a relative permeability so as to be a featured parameter; and
   c) tracking and classifying the history abnormal events in accordance with such a featured parameter.

* * * * *